(12) United States Patent
Imasaka et al.

(10) Patent No.: US 9,140,719 B2
(45) Date of Patent: Sep. 22, 2015

(54) TERMINAL HOLDING DEVICE

(75) Inventors: Yusuke Imasaka, Sayama (JP); Kenji Nakamura, Tokorozawa (JP); Hideaki Takahashi, Ageo (JP); Yoshiaki Tsuchida, Ota (JP); Hitoshi Yamazaki, Sayama (JP)

(73) Assignee: PIONEER CORPORATION, Kanagawa (JP)

( * ) Notice: Subject to any disclaimer, the term of this patent is extended or adjusted under 35 U.S.C. 154(b) by 206 days.

(21) Appl. No.: 13/822,161

(22) PCT Filed: Jul. 26, 2011

(86) PCT No.: PCT/JP2011/066956
§ 371 (c)(1),
(2), (4) Date: Mar. 11, 2013

(87) PCT Pub. No.: WO2012/035886
PCT Pub. Date: Mar. 22, 2012

(65) Prior Publication Data
US 2013/0174660 A1 Jul. 11, 2013

(30) Foreign Application Priority Data

Sep. 16, 2010 (WO) .................. PCT/JP2010/066068
Oct. 22, 2010 (WO) .................. PCT/JP2010/068712

(51) Int. Cl.
| | | |
|---|---|---|
| G01P 1/02 | (2006.01) |
| G01P 15/00 | (2006.01) |
| F16M 13/00 | (2006.01) |
| B60R 11/00 | (2006.01) |
| B60R 11/02 | (2006.01) |
| F16M 11/04 | (2006.01) |
| F16M 11/10 | (2006.01) |
| F16M 11/14 | (2006.01) |
| F16M 11/20 | (2006.01) |
| G01C 21/26 | (2006.01) |
| F16M 13/02 | (2006.01) |

(52) U.S. Cl.
CPC ................. *G01P 15/00* (2013.01); *B60R 11/02* (2013.01); *F16M 11/041* (2013.01); *F16M 11/105* (2013.01); *F16M 11/14* (2013.01); *F16M 11/2021* (2013.01); *F16M 13/00* (2013.01); *F16M 13/022* (2013.01); *G01C 21/265* (2013.01); *B60R 2011/0005* (2013.01); *B60R 2011/0089* (2013.01)

(58) Field of Classification Search
USPC ..................... 73/493, 431, 866.5; 361/679.01
See application file for complete search history.

(56) References Cited

U.S. PATENT DOCUMENTS

| | | | | |
|---|---|---|---|---|
| 6,755,081 B2* | 6/2004 | Furukubo et al. | ............... | 73/493 |
| 6,810,735 B2* | 11/2004 | Kaneko et al. | .................. | 73/493 |
| 7,267,003 B2* | 9/2007 | Hiraoka et al. | ................. | 73/493 |
| 2013/0176669 A1* | 7/2013 | Takahashi et al. | ....... | 361/679.01 |

FOREIGN PATENT DOCUMENTS

| | | | |
|---|---|---|---|
| EP | 0995972 | * | 4/2000 |
| JP | 2000-106597 | * | 4/2000 |

(Continued)

OTHER PUBLICATIONS

International Search Report, PCT/JP2011/066956, Oct. 11, 2011.

*Primary Examiner* — Helen Kwok
(74) *Attorney, Agent, or Firm* — Young & Thompson

(57) ABSTRACT

The terminal holding device includes an attaching unit to be attached to a vehicle, a holding unit which removably holds a terminal device in such a manner that a display unit of the terminal device is exposed and which includes a contact surface to be contact with the terminal device, an acceleration sensor which detects acceleration in a direction from a side of the contact surface to a side opposite to the contact surface, and a supplying unit which supplies a detection signal of the acceleration sensor to the terminal device.

6 Claims, 15 Drawing Sheets

(56) References Cited

FOREIGN PATENT DOCUMENTS

| | | | |
|---|---|---|---|
| JP | 2002-261903 | * | 10/2000 |
| JP | 2006-148843 | * | 6/2006 |
| JP | 2008-078793 | | 4/2008 |
| JP | 2009-177294 | | 8/2009 |
| JP | 2010-086215 | | 4/2010 |

* cited by examiner

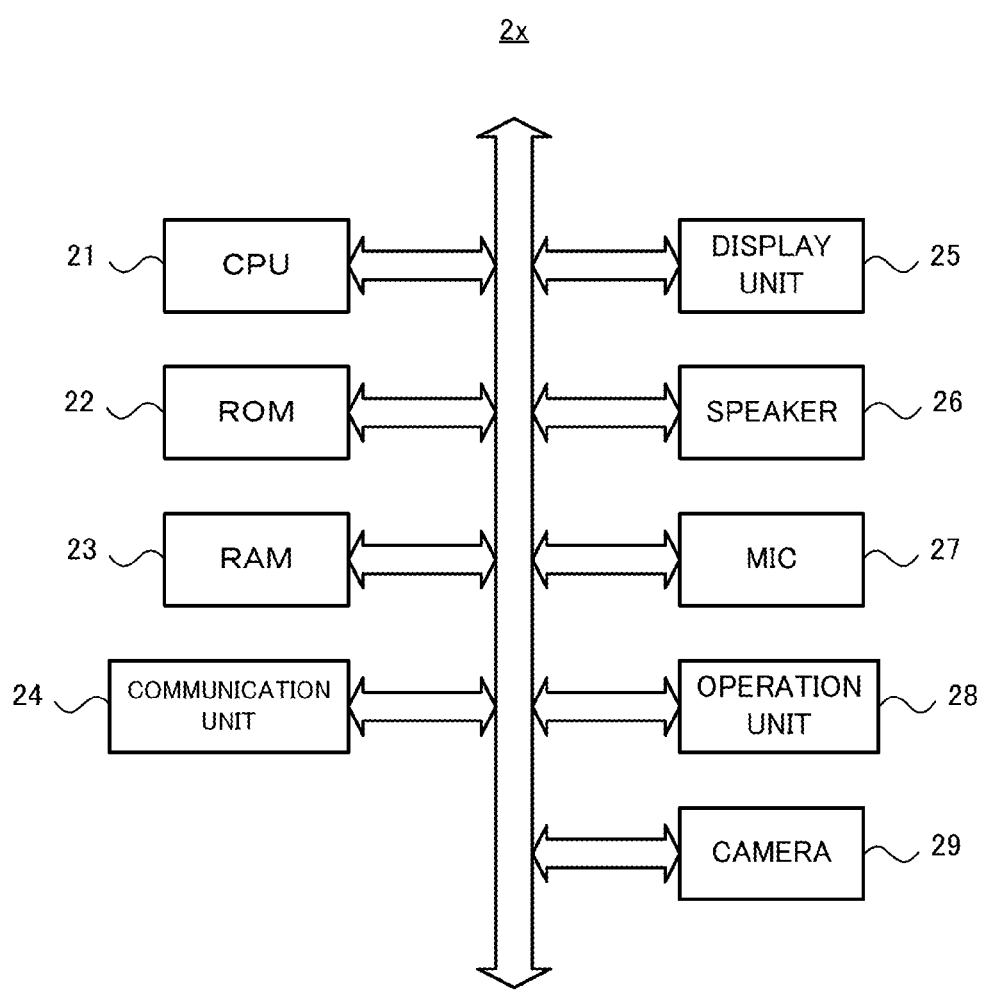

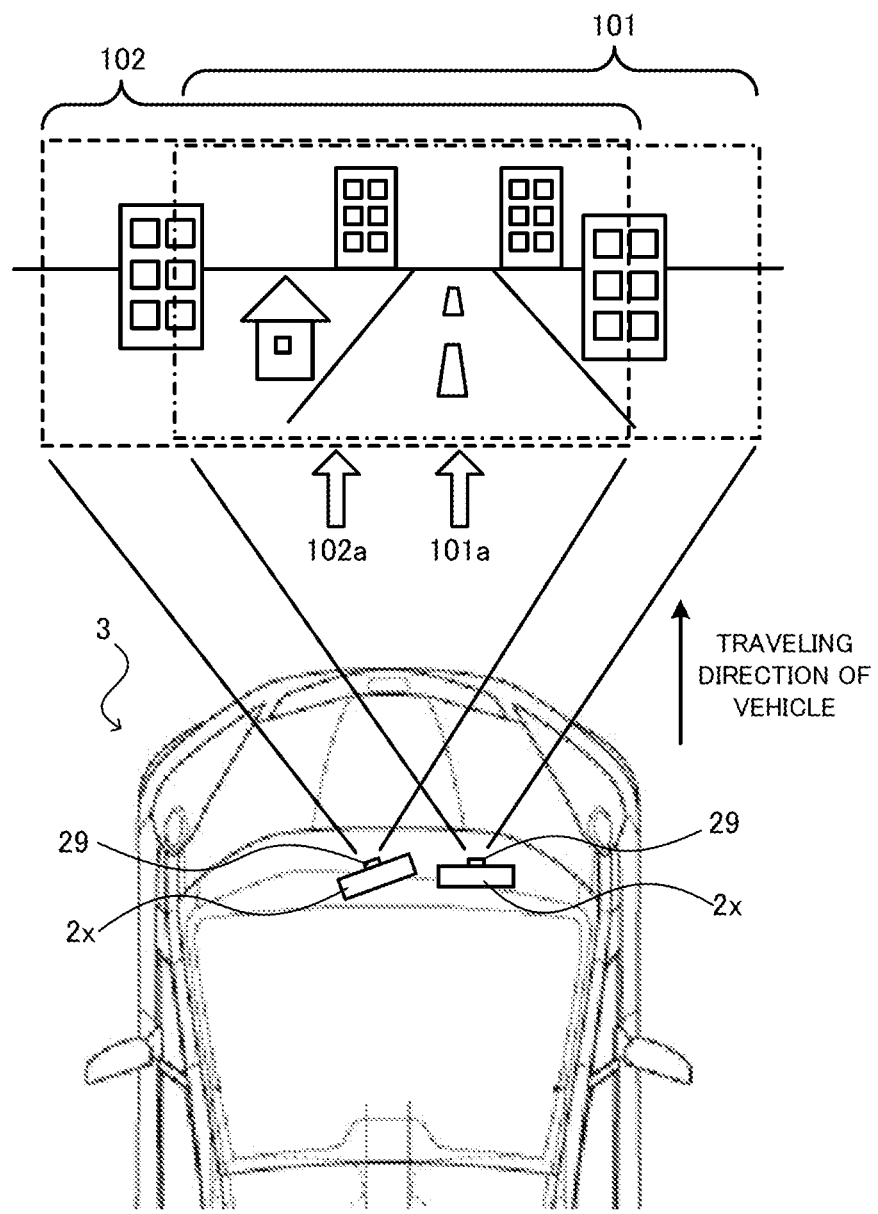

TERMINAL HOLDING DEVICE

TECHNICAL FIELD

The present invention relates to a terminal holding device used to install a terminal device in a movable body.

BACKGROUND TECHNIQUE

Recently, a portable type navigation device is widely used. Patent Document 1 discloses an example of installing a portable type navigation device in a vehicle by using a cradle.

On the other hand, recently, a portable type terminal device such as a high-function portable telephone called "smartphone" is installed and used in a movable body such as a vehicle. Applications similar to the navigation device are proposed for a smartphone, and a smartphone can be installed in a vehicle to be used as a navigation device. Generally, a smartphone have a GPS function, but does not have a sensor such as a gyro sensor.

PRIOR ART DOCUMENTS

Patent Documents

Patent Document 1: Japanese Patent Application Laid-open under No. 2010-86215

SUMMARY OF INVENTION

Problem to be Solved by the Invention

The above is one example of the problem to be solved by the present invention. It is an object of the present invention to provide a terminal holding device capable of supplying an output of a built-in sensor to a terminal device held by the terminal holding device.

Means for Solving the Problem

According the present invention, there is provided a terminal holding device including: an attaching unit to be attached to a vehicle; a holding unit which removably holds a terminal device in such a manner that a display unit of the terminal device is exposed and which includes a contact surface to be contact with the terminal device; an acceleration sensor which detects acceleration in a direction from a side of the contact surface to a side opposite to the contact surface; and a supplying unit which supplies a detection signal of the acceleration sensor to the terminal device.

According to the present invention, there is provided a terminal holding device including: an attaching unit to be attached to a vehicle; a holding unit which removably holds a terminal device in such a manner that a display unit of the terminal device is exposed; an acceleration sensor which detects acceleration in a direction from a side of the display unit of the terminal device held by the holding unit to a side opposite to the display unit; and a supplying unit which supplies a detection signal of the acceleration sensor to the terminal device.

BRIEF DESCRIPTION OF THE DRAWINGS

FIG. 9 illustrates a schematic configuration of the terminal device.

FIG. 10 is a diagram for explaining a drawback taking place in accordance with a mounting position of the terminal device.

MODE TO EXERCISE THE INVENTION

Figure 1C:
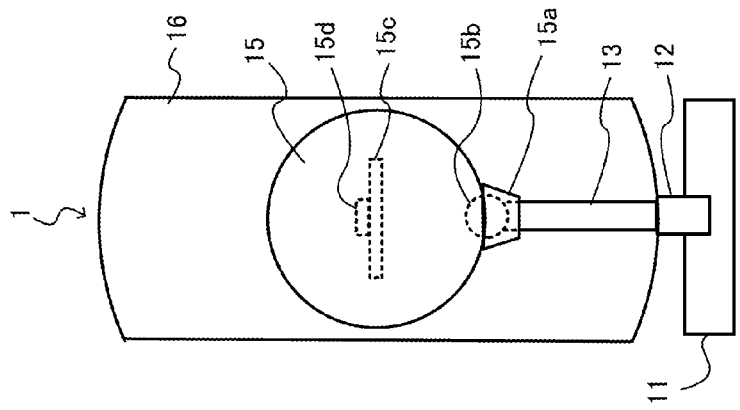
FIGS. 1A to 1C are a front view, a side view and a rear view of a terminal holding device according to a first embodiment.

According to a preferred mode of the invention, a terminal holding device includes: an attaching unit to be attached to a vehicle; a holding unit which removably holds a terminal device in such a manner that a display unit of the terminal device is exposed and which includes a contact surface to be contact with the terminal device; an acceleration sensor which detects acceleration in a direction from a side of the contact surface to a side opposite to the contact surface; and a supplying unit which supplies a detection signal of the acceleration sensor to the terminal device.

The above terminal device is attached to a vehicle by the attaching unit, and holds the terminal device by the holding unit. The holding unit includes a contact surface with the terminal device to removably hold the terminal device in such a manner that the display unit of the terminal device is exposed. In addition, the terminal holding device includes an acceleration sensor which detects acceleration in a direction from a side of the contact surface to a side opposite to the contact surface, and a supplying unit which supplies a detection signal of the acceleration sensor to the terminal device. Thus, the detection signal by the acceleration sensor built in the terminal holding device can be appropriately supplied to the terminal device. Therefore, the terminal device can perform processing such as navigation by using the obtained acceleration.

One mode of the above terminal holding device includes a connecting unit which changes an attaching angle of the holding unit with respect to the acceleration sensor. By this, the attaching angle of the holding unit with respect to the acceleration sensor can be appropriately changed.

In another mode of the above terminal holding device, the connecting unit changes the attaching angle of the holding unit with respect to the acceleration sensor, without changing an attaching angle of the acceleration sensor with respect to the attaching unit. By this, if the attaching angle of the holding unit with respect to the acceleration sensor is changed, the attaching angle of the acceleration sensor with respect to the attaching unit can be appropriately maintained.

Preferably, the above terminal holding device includes a housing unit which houses the acceleration sensor, and the connecting unit can rotate the holding unit with respect to the housing unit.

Preferably, in the above terminal holding device, the acceleration sensor is provided on the holding unit at a side opposite to the side holding the terminal device.

In another mode of the above terminal holding device, the holding unit includes a hole which exposes a camera unit provided on the terminal device; and the acceleration sensor is provided to detect the acceleration in a direction penetrating the hole. By the hole provided on the holding unit, the terminal device can appropriately capture image by the camera in a state held by the terminal holding device. Since the acceleration sensor can detect the acceleration in the penetrating direction of the hole, i.e., the acceleration in the image capturing direction of the camera, the terminal device can obtain the acceleration of the camera in the image capturing direction.

According to another aspect of the present invention, a terminal holding device includes: an attaching unit to be attached to a vehicle; a holding unit which removably holds a terminal device in such a manner that a display unit of the terminal device is exposed; an acceleration sensor which detects acceleration in a direction from a side of the display unit of the terminal device held by the holding unit to a side opposite to the display unit; and a supplying unit which supplies a detection signal of the acceleration sensor to the terminal device. Also by the above terminal holding device, the detection signal of the acceleration sensor built in the terminal holding device can be appropriately supplied to the terminal device.

EMBODIMENT

The preferred embodiments of the present invention will now be described below with reference to the attached drawings.

1st Embodiment

Figure 1B:
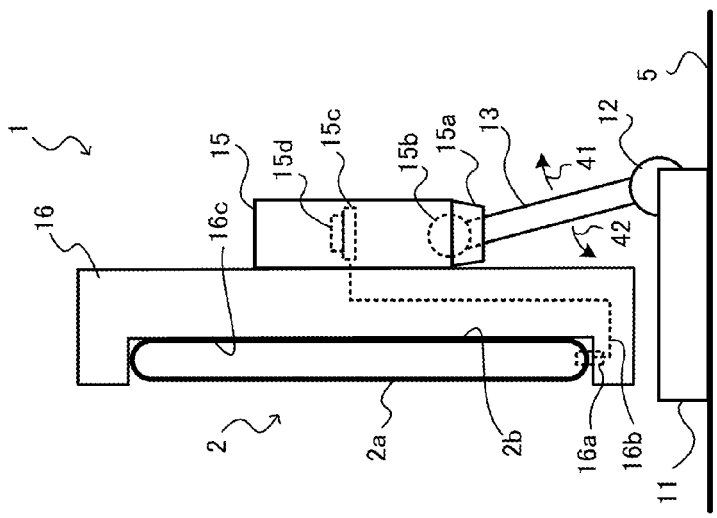
Figure 1A:
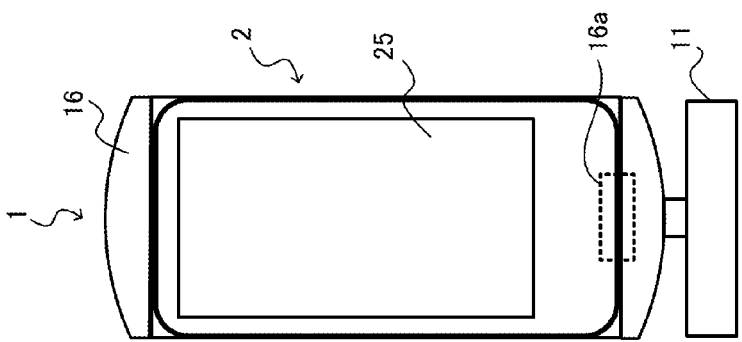

FIGS. 1A to 1C illustrate a terminal holding device 1 according to a first embodiment of the present invention. The terminal holding device 1 functions as a so-called cradle, to which a terminal device 2 such as a smartphone is attached.

Figure 2B:
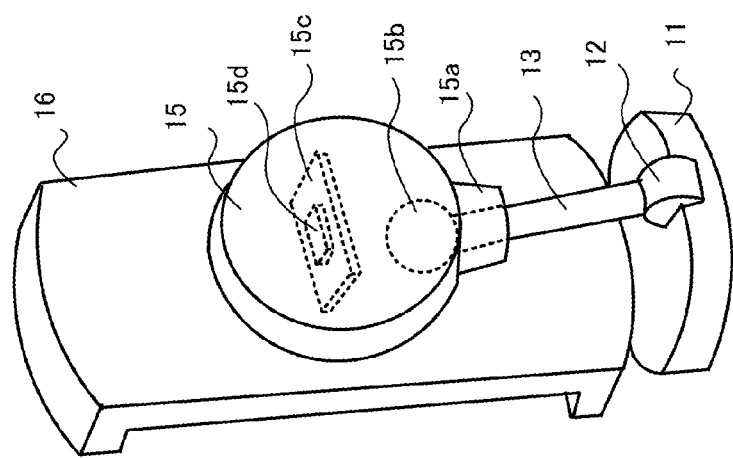
FIGS. 2A and 2B are anther front view and a rear perspective view of the terminal holding device shown in FIGS. 1A to 1C.
Figure 2A:
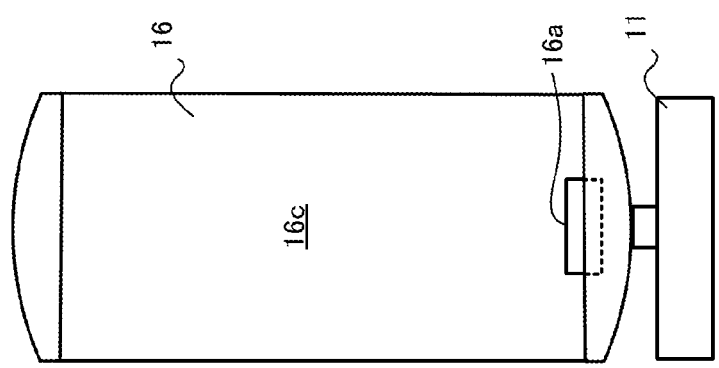
Figure 3A:
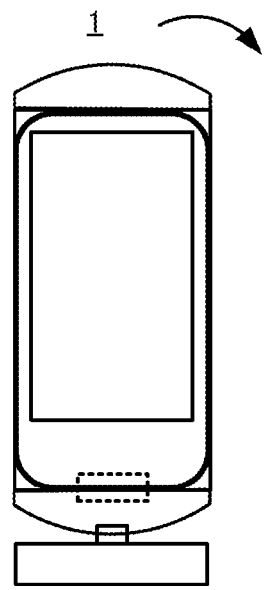
FIGS. 3A to 3D are diagrams illustrating rotated states of a terminal holding device.
Figure 3B:
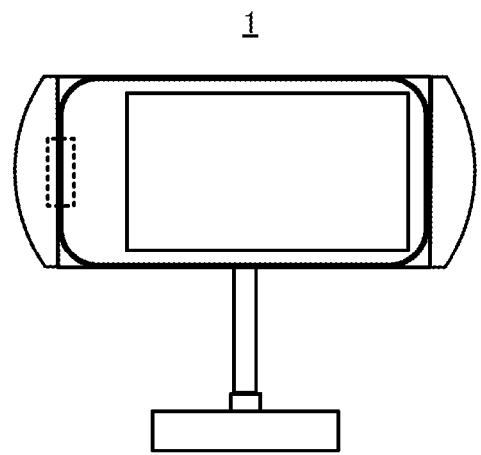
Figure 3C:
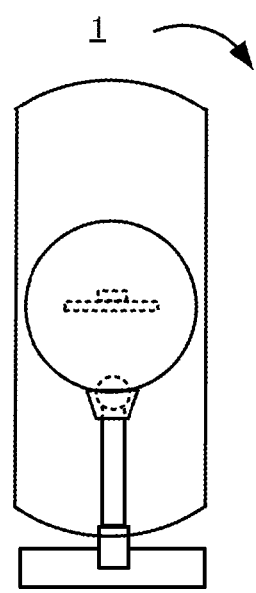
Figure 3D:
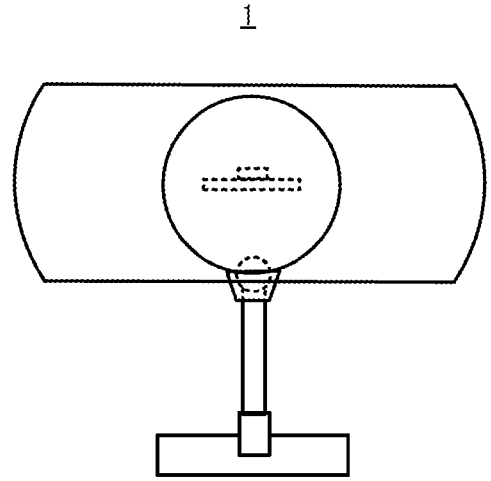

FIGS. 1A to 1C illustrate the terminal holding device 1 in a state that it is holding the terminal device 2. Specifically, FIG. 1A is a front view of the terminal holding device 1, FIG. 1B is a side view of the terminal holding device 1, and FIG. 1C is a rear view of the terminal holding device 1. FIG. 2A is a front view of the terminal holding device 1 in a state that it is not holding the terminal device 2. FIG. 2B is a perspective view of the terminal holding device 1 observed from its rear side, in a state that it is not holding the terminal device 2.

As illustrated, the terminal holding device 1 includes a base 11, a hinge 12, an arm 13, a substrate holder 15 and a terminal holder 16.

The base 11 functions as a base used when the terminal holding device 1 is attached to a movable body such as a vehicle. For example, the base 11 is provided with a sucker or an adhesive tape at its underside, and the base 11 is fixed to an installation surface 5 such as a dashboard of the vehicle by the adhesive tape.

The hinge 12 is fixed to the arm 13, and is attached to the base 11 in a manner rotatable with respect to the base 11. By the rotation of the hinge 12, the arm 13 swings in a front-rear direction of the terminal device 2, i.e., in a direction of the arrows 41 and 42 in FIG. 1B. Namely, by rotating the arm 13 via the hinge 12 with respect to the base 11 fixed to the installation surface 5 of the vehicle, it is possible to adjust the installation angle of the substrate holder 15 and the terminal holder 16 with respect to the installation surface 5.

The substrate holder 15 is a holder which holds a substrate for a gyro sensor. Specifically, the substrate holder 15 includes a cover 15a, a ball link 15b, a sensor substrate 15c and a sensor 15d.

The ball link 15b is attached to an upper end of the arm 13, and holds the substrate holder 15 at an arbitrary angle with respect to the arm 13. The cover 15a is provided at a lower end of the substrate holder 15, and has a function of restricting the rotation of the substrate holder 15 with respect to the arm 13, the detail of which will be described later.

The sensor substrate 15c is provided inside of the substrate holder 15, and the sensor substrate 15c is provided with the sensor 15d. A preferred example of the sensor 15d is a gyro sensor and/or an acceleration sensor.

The terminal holder 16 is a holder which holds the terminal device 2. The terminal holder 16 includes a connector 16a and a wiring 16b. The connector 16a is provided at the bottom of the front surface, i.e., the surface on which the terminal device 2 is set, and is connected to the connector of the terminal device 2 when the terminal device 2 is set in the terminal holder 16. The connector 16a is electrically connected to the sensor substrate 15c via the wiring 16b. Therefore, the detection signal of the sensor 15d is supplied to the terminal device 2 via the sensor substrate 15c, the wiring 16b and the connector 16a.

The terminal device 2 includes a display surface 2a, which is a front side of the body of the terminal device 2 and includes a display unit, and a rear surface 2b which is a rear side of the body of the terminal device 2. Normally, the terminal device 2 is formed in a rectangular flat-plate shape, and the display surface 2a and the rear surface 2b are substantially parallel with each other. The display surface 2a is also referred as "front surface 2a".

The terminal holder 16 has a contact surface 16c at its front side. When the terminal device 2 is mounted on the terminal holder 16, the contact surface 16c contacts and supports the rear surface 2b of the terminal device 2. In the example shown in FIGS. 1A and 1B, the contact surface 16c of the terminal holder 16 is formed such that its entire surface contacts the rear surface 2b of the terminal device 2. Instead, it is possible to employ such a configuration that one or plural parts of the contact surface 16c is formed to be partly protruding, and only the protruding parts contact the rear surface 2b of the terminal device 2.

In the above-described configuration, the base 11 corresponds to an example of "an attaching unit" of the invention, the terminal holder 16 corresponds to an example of "a holding unit" of the invention, the connector 16a corresponds to an example of "a supplying unit" of the invention, and the substrate holder 15 corresponds to an example of "a housing unit" of the invention.

Next, the rotation function of the terminal holder 16 with respect to the substrate holder 15 will be described. The terminal holder 16 holding the terminal device 2 is rotatable, by the unit of 90 degrees, with respect to the substrate holder 15. Namely, when the state shown in FIG. 1A is defined as the rotation angle 0 degree, the terminal holder 16 can be fixed in four states being rotated by 0 degree, 90 degrees, 180 degrees and 270 degrees in a clockwise or counterclockwise direction. The reason why it can be fixed by the unit of 90 degrees is that a user normally uses the terminal device 2 in such a state that the display unit is arranged vertically or laterally, when the user sees the display unit. As described above, the terminal device 2 normally has a rectangular flat-plate shape. "Arranging vertically" means such an arrangement that the longitudinal direction of the display unit is vertical, and "arranging laterally" means such an arrangement that the longitudinal direction of the display unit is lateral.

FIGS. 3A to 3D illustrate the states in which the terminal holder 16 is rotated. When the terminal holding device 1 is observed from the front side, rotating the terminal holder 16 by 90 degrees in the direction of the arrow from the state of FIG. 3A results in the state of FIG. 3B. When the terminal holding device is observed from the rear side, rotating the terminal holder 16 in the direction of the arrow from the state of FIG. 3C results in the state of FIG. 3D.

Structurally, by providing a rotational axis (not shown) at a substantial center of the substrate holder 15 and fixing the terminal holder 16 to the rotational axis, the terminal holder 16 becomes rotatable with respect to the substrate holder 15. Also, by providing pairs of concavity-convexity or recess-protrusion engage with each other at the positions of every 90-degree rotation angles, to the surface where the substrate holder 15 and the terminal holder 16 abut with each other, the terminal holder 16 can be fixed at the positions of every 90-degree rotation angles. The rotation axis corresponds to an example of "a connecting unit" of the invention. The above-described structure is merely an example, and other structure may be employed as long as the terminal holder 16 can be fixed to the substrate holder 15 at every 90-degree rotation angles.

Next, the setting angle of the sensor substrate 15c will be described. As illustrated in FIG. 1B, in the first embodiment, the sensor substrate 15c is fixed to the substrate holder 15 so as to be perpendicular to the display surface 2a of the terminal device 2. As described above, the terminal device 2 is normally formed in a rectangular flat-plate shape, and the display surface 2a and the rear surface 2b are substantially parallel with each other. Also, as described above, the rear surface 2b of the terminal device 2 and the contact surface 16c of the terminal holder 16 are substantially parallel with each other. Therefore, the sensor substrate 15c is normally mounted on the substrate holder 15 so as to be perpendicular to the display surface 2a and the rear surface 2b of the terminal device 2 as well as the contact surface 16c of the terminal holder 16. Further, the sensor substrate 15c is mounted on the substrate holder 15 so as to be perpendicular to the longitudinal direction or the lateral direction of the display surface 2a, when the terminal holder 16 is fixed in such a state that it is rotated by one of the above-mentioned four angles of 90-degree difference.

By mounting the sensor substrate 15c on the substrate holder 15 in this manner, the sensor substrate 15c is mounted horizontally, i.e., in a state being substantially parallel with the ground, in whatever state the user attaches the terminal holding device 1 to the installation surface 5 of the vehicle. This is because, the user normally installs the terminal holding device 1 in such a manner that the display surface 2a of the terminal device 2 becomes substantially perpendicular to the ground. Normally, the user sits on the seat of the vehicle in a posture looking the traveling direction and keeping his or her upper half of body substantially perpendicular to the ground. Therefore, the user installs the terminal holding device 1 to the installation surface 5 of the vehicle such that the display surface 2a substantially directly confronts the user, i.e., the display surface 2a becomes perpendicular to the ground. Even if the installation surface 5 is an inclined surface, the user must adjust the angle by the rotation angle adjusting function of the hinge 12 and the ball link 15b of the terminal holding device such that the display surface 2a of the terminal device 2 becomes substantially perpendicular to the ground. Therefore, at whatever position the terminal holding device 1 is installed, the sensor substrate 15c is always arranged horizontally, i.e., in parallel with the ground. As a result, the sensor 15d such as a gyro sensor is always set horizontally, thereby enabling accurate detection.

Figure 4A:
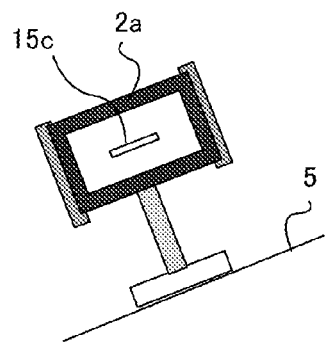
FIGS. 4A to 4E are diagrams for explaining advantage of making the terminal holding device rotatable by every 90 degrees.
Figure 4B:
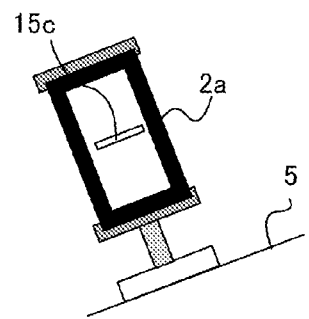
Figure 4C:
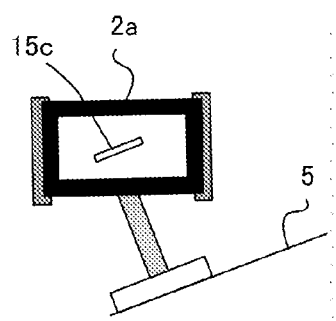
Figure 4D:
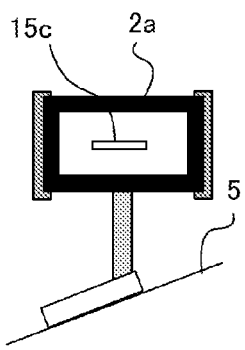
Figure 4E:
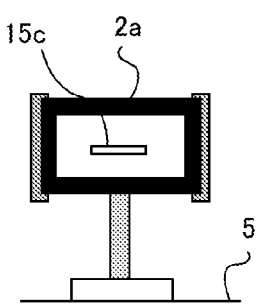

With reference to FIGS. 4A to 4E, the setting angle of the sensor substrate 15c will be further described. In the first embodiment, the terminal holder 16 can be fixed to the substrate holder 15 only at every 90-degree rotation angle. Therefore, it is not possible to fix the terminal holder 16 at such a rotation angle that the display unit is arranged laterally or longitudinally as shown in FIG. 4C, when the terminal holding device 1 is attached to the inclined installation surface 5 of the vehicle. If the terminal holder 16 is rotated by the unit of 90-degrees, the display unit of the terminal device 2 becomes inclined as shown in FIGS. 4A and 4B, and the sensor substrate 15c is also inclined. Therefore, the user uses the hinge 12 to adjust the angle such that the display unit of the terminal device 2 is not inclined as shown in FIG. 4D. As a result, naturally the sensor substrate 15c becomes horizontal. Or the user avoids the inclined installation surface 5 and chooses a flat installation surface 5 as shown in FIG. 4E, and hence the sensor substrate 15c is set horizontally. In this way, according to the first embodiment, the user does not have to consider the inclination of the sensor substrate 15c and the sensor substrate 15c is held in the horizontal state, as long as the user installs the terminal device 2 in an easy-to-see state, i.e., in such a state that the display surface is substantially perpendicular to the ground and is not inclined.

Next, description will be given of such a function that the rotation of the substrate holder 15 by the ball link 15b is regulated by the cover 15a of the substrate holder 15. In the first embodiment, in addition to that the sensor substrate 15c is held horizontally as described above, the rotation of the substrate holder 15 is regulated by the cover 15a to further ensure that the sensor substrate 15c is held in a nearly horizontal state.

A sensor such as a gyro sensor is preferably used in a horizontal state, and its tolerable angle of inclination (hereinafter referred to as "tolerable inclination angle") is determined. Namely, the sensor can perform accurate detection when it is set within the tolerable inclination angle, even if it is not completely in a horizontal state. Therefore, in the first embodiment, when the terminal holding device 1 is attached to the installation surface 5, the cover 15a regulates the rotation of the substrate holder 15 such that the angle of the sensor substrate 15c does not exceed the tolerable inclination angle.

Figure 5C:
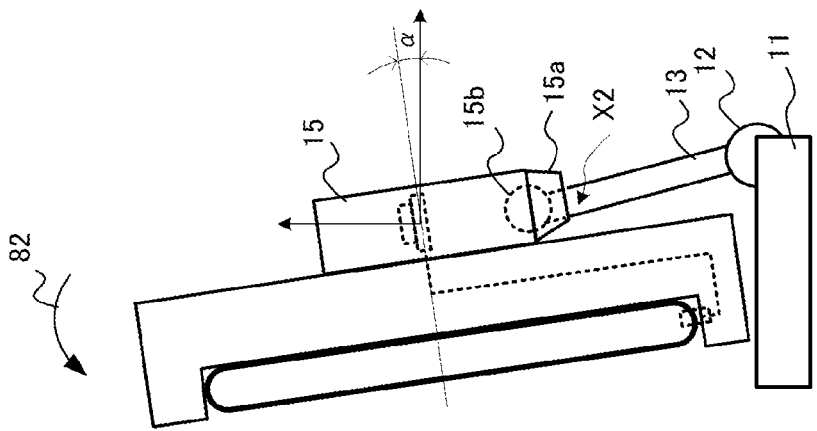
FIGS. 5A to 5C are diagrams illustrating relationship between inclination of the terminal holding device and inclination of a sensor substrate.
Figure 5B:
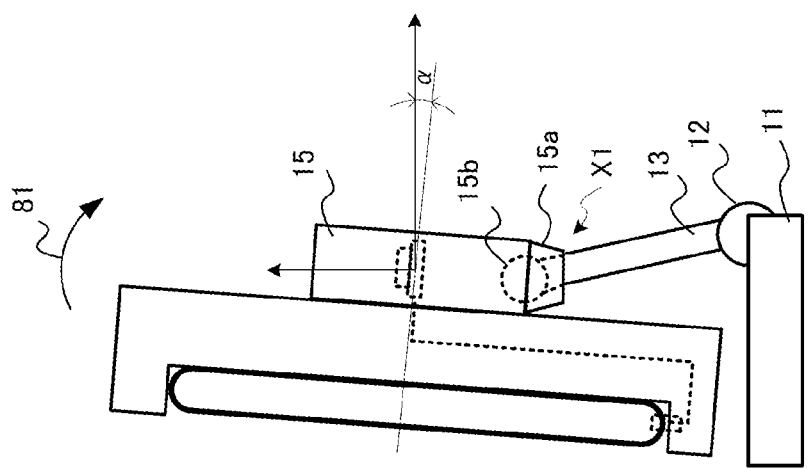
Figure 5A:
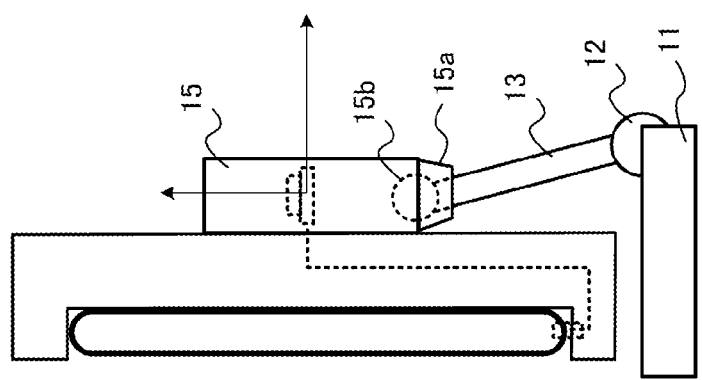

FIGS. 5A to 5C illustrate the states of rotating the substrate holder 15 and the terminal holder 16 in the front and rear direction by using the ball link 15b. In the following description, the substrate holder 15 and the terminal holder 16 integrally rotated is referred to as "holding unit" for convenience of explanation. The tolerable inclination angle of the sensor 15d is expressed as "α".

FIG. 5A illustrates a state wherein the rotation of the ball link 15b is regulated such that the terminal device 2 becomes substantially perpendicular to the ground. In this case, the sensor substrate 15c is held in a horizontal state. Also, in this case, the upper end of the arm 13 does not contact the edge of the lower end of the cover 15a, and the cover 15a does not regulate the rotation of the holding unit.

FIG. 5B illustrates a state wherein the holding unit is rotated in the direction of the arrow 81 by using the ball link 15b. When the holding unit is rotated in the direction of the arrow 81, the sensor substrate 15c is also inclined with respect to the horizontal direction accordingly. However, when the inclination angle of the sensor substrate 15c reaches the tolerable inclination angle α, the arm 13 contacts the edge of the lower end of the cover 15a, as shown by the arrow X1, to regulate the rotation of the holding unit. Namely, the holding unit cannot rotate in the direction of the arrow 81 any further. Thus, the sensor substrate 15c is prevented from being inclined larger than the tolerable inclination angle α with respect to the horizontal direction.

FIG. 5C illustrates a state wherein the holding unit is rotated in the direction of the arrow 82, i.e., in the direction opposite to FIG. 5A, by using the ball link 15b. Also in this case, when the inclination angle of the sensor substrate 15c reaches the tolerable inclination angle α, the edge of the lower end of the cover 15a contacts the arm 13 as shown by the arrow X2, and further rotation is prevented. Thus, the sensor substrate 15c is prevented from being inclined larger than the tolerable inclination angle α with respect to the horizontal direction.

Figure 6C:
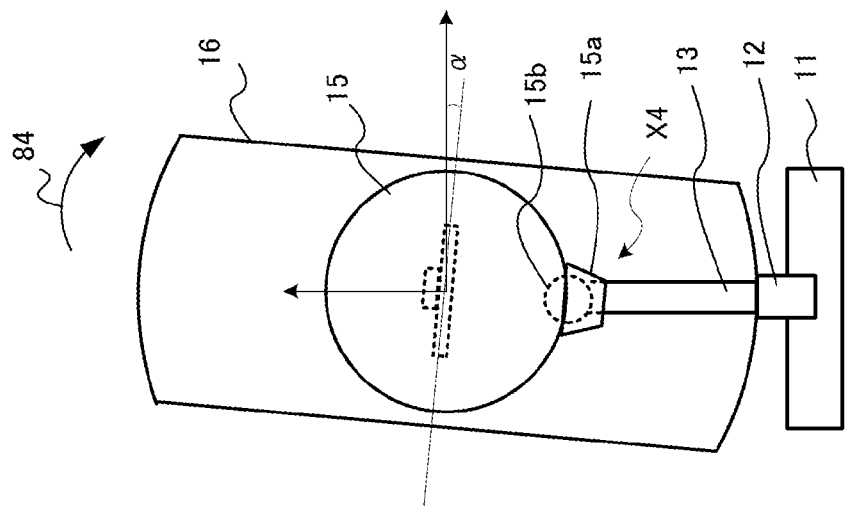
FIGS. 6A to 6C are diagrams illustrating relationship between inclination of the terminal holding device and inclination of the sensor substrate.
Figure 6B:
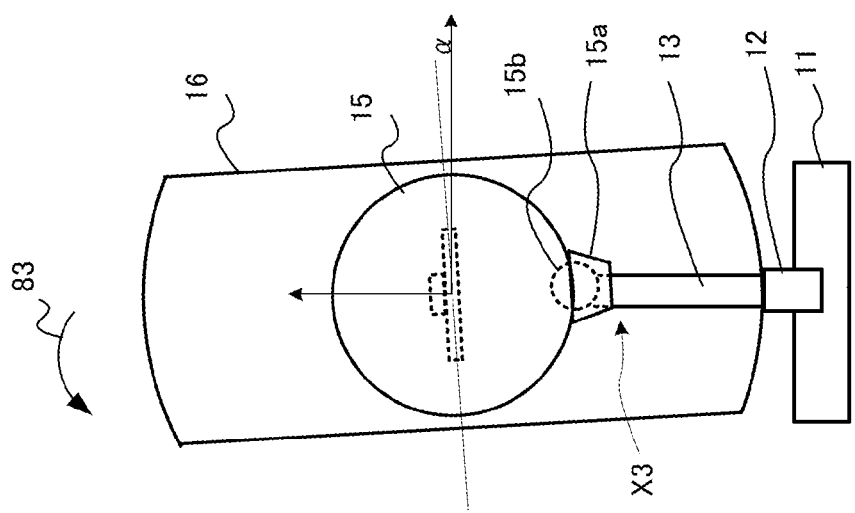
Figure 6A:
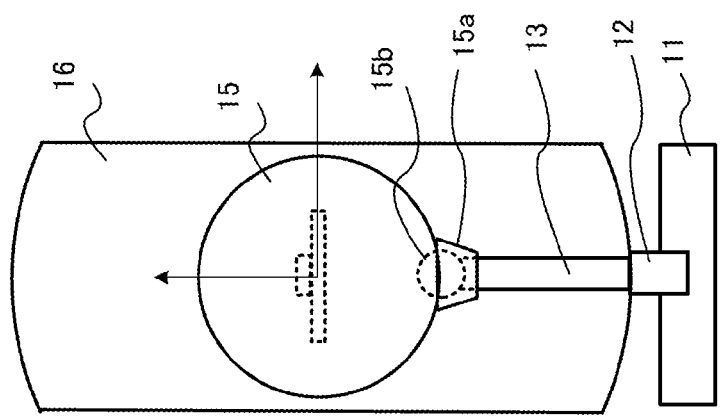

FIGS. 6A to 6C illustrate the states of rotating the holding unit in the left and right direction by using the ball link 15b. In FIG. 6A, the sensor substrate 15c is held in a horizontal state. In this case, the edge of the lower end of the cover 15a does not contact the arm 13, and the cover 15a does not regulate the rotation of the holding unit.

FIG. 6B illustrates a state wherein the holding unit is rotated in the direction of the arrow 83 by using the ball link 15b. When the holding unit is rotated in the direction of the arrow 83, the sensor substrate 15c is also inclined with respect to the horizontal direction accordingly. However, when the inclination angle of the sensor substrate 15c reaches the tolerable inclination angle α, the arm 13 contacts the edge of the lower end of the cover 15a to regulate the rotation of the holding unit. Namely, the holding unit cannot be rotated in the direction of the arrow 83 any further. Thus, the sensor substrate 15c is prevented from being inclined larger than the tolerable inclination angle α with respect to the horizontal direction.

FIG. 6C illustrates a state wherein the holding unit is rotated in the direction of the arrow 84, i.e., in the direction opposite to FIG. 6A, by using the ball link 15b. Also in this case, when the inclination angle of the substrate 23 reaches the tolerable inclination angle α, the edge of the lower end of the cover 15a contacts the arm 13 to prevent further rotation. Thus, the sensor substrate 15c is prevented from being inclined larger than the tolerable inclination angle α with respect to the horizontal direction.

As described above, in the first embodiment, the cover 15a regulates the rotation of the holding unit by using the ball link 15b, and therefore the sensor substrate 15c is prevented from being inclined larger than the tolerable inclination angle. While the above example employs such a structure that the cover 15a has a taper shape and its diameter at the lower end is smaller than that of the upper end, this is merely an example. The rotation of the holding unit by using the ball link 15b may be regulated by other structure. For example, the rotation larger than the tolerable inclination angle may be prevented by adjusting the diameter at the lower end of the cover 15a and the diameter of the arm 13, without making the shape of the cover 15a tapered.

As described above, according to the terminal holding device 1 of the first embodiment, since the sensor substrate 15c is mounted so as to be perpendicular to the display surface 2a of the terminal device 2, the sensor substrate 15c is held substantially horizontally only if the user attaches the terminal holding device 1 to the installation surface 5 of the vehicle in a normal, easy-to-see condition. Therefore, the user can mount the terminal holding device 1 without considering the inclination angle of the sensor substrate 15c.

Further, since the terminal holding device 1 has a structure that the rotation of the holding unit by using the ball link 15b is regulated such that the inclination angle of the sensor substrate 15c does not exceed the tolerable inclination angle, the sensor substrate 15c is not inclined larger than the tolerable inclination angle even if the user finely adjusts the angle of the substrate holder 15 by using the rotation function of the ball link 15b.

Modified Examples of 1st Embodiment

While the above-described first embodiment is configured such that the terminal holder 16 can be rotated around the substrate holder 15 serving as the axis, the present invention is not limited to this example. For example, in a case of a terminal device that is arranged only in one of the longitudinal and lateral direction, the terminal holder 16 may be configured non-rotatable with respect to the substrate holder 15.

While the terminal holder 16 is configured to be fixable in the states rotated by 0 degree, 90 degrees, 180 degrees and 270 degrees with respect to the substrate holder 15 in the above first embodiment, the present invention is not limited to this example. For example, the terminal holder 16 may be configured to be fixable in two states rotated by 0 degree and 90 degrees with respect to the substrate holder 15. Namely, the terminal device 2 may be arranged in two state, i.e., longitudinally or laterally.

Figure 7:
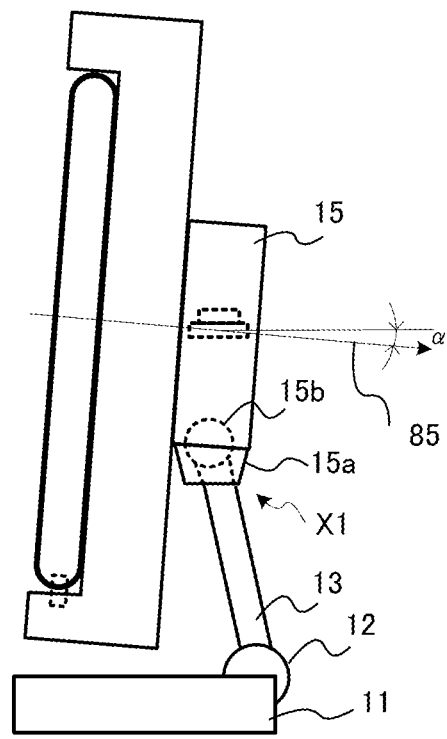
FIG. 7 is a side view illustrating a configuration of a terminal holding device according to a modified example of the first embodiment.

In the above first embodiment, the sensor substrate 15c is mounted on the substrate holder 15 so as to be perpendicular to the display surface 2a of the terminal device 2. However, the sensor substrate 15c may be, not completely perpendicular, but inclined within the tolerable inclination angle of the sensor substrate 15c. FIG. 7 illustrates a side view of the terminal holding device according to this modified example. In the example of FIG. 7, the arrow 85 indicates the direction perpendicular to the display surface 2a of the terminal device 2, and the sensor substrate 15c is mounted on the substrate holder 15 in a state being inclined by the tolerable inclination angle α with respect to the direction of the arrow 85. Namely, the sensor substrate 15c is mounted on the substrate holder 15 to have an angle (90-α) degrees with respect to the display surface 2a of the terminal device 2. Therefore, the sensor substrate 15c becomes substantially parallel with the ground when the terminal holding device 1 is installed in the vehicle such that the display surface 2a of the terminal device 2 is directed slightly upwardly.

2nd Embodiment

Next, a second embodiment will be described.

(Device Configuration)

Figure 8C:
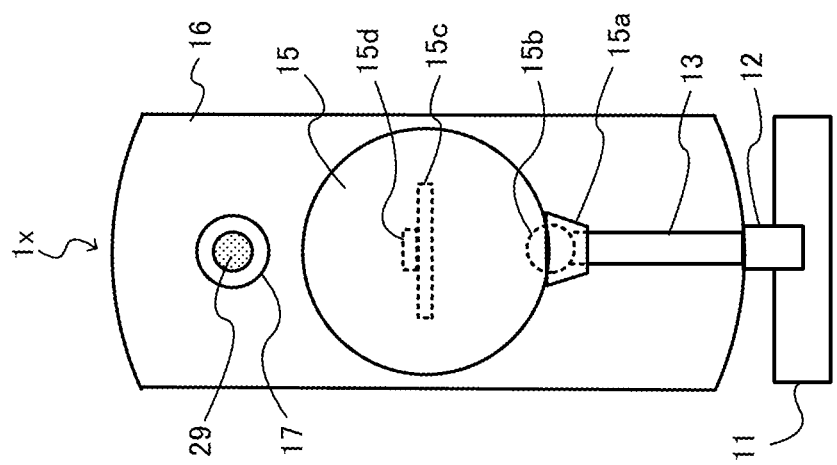
FIGS. 8A to 8C illustrate a terminal holding device according to a second embodiment.
Figure 8B:
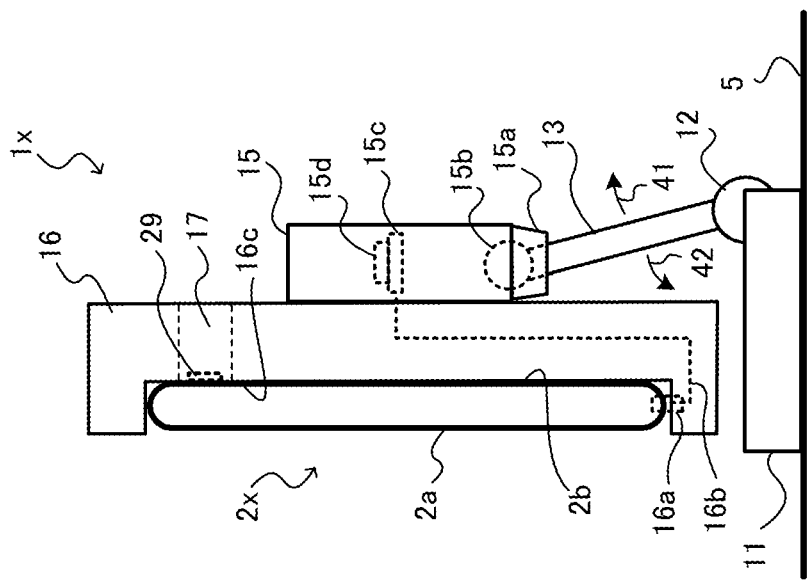
Figure 8A:
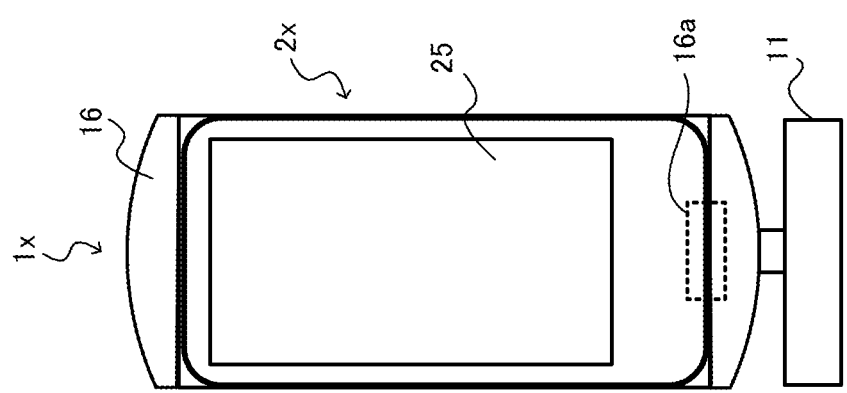

FIGS. 8A to 8C illustrate a terminal holding device 1x according to a second embodiment. FIG. 8A is a front view, FIG. 8B is a side view, and FIG. 8C is a rear view. It is noted that the constitutional elements identical to those shown in FIGS. 1A to 1C are denoted by the reference numbers identical to FIGS. 1A to 1C, and the description thereof will be omitted.

In the second embodiment, on the rear surface 2b of the terminal device, a camera 29 is provided. Also, the terminal holder 16 of the terminal holding device 1x cis formed with a hole 17 at the position confronting the camera 29 when the terminal device 2x is held by the terminal holding device 1x. The hole 17 has a diameter larger than the diameter of the lens of the camera 29. Thus, in a state that the terminal device 2x is held by the terminal holder 1, the camera 29 is not suffered from the outer wall of the terminal holder 16 and can capture image behind the terminal holder 16. Specifically, the camera 29 captures image outside the vehicle.

In the example shown in FIGS. 8B and 8C, the terminal holder 16 is configured to cover substantially entire area of the rear surface 2b of the terminal device 2x and is formed with the hole 17 at the position confronting the camera 29 of the terminal device 2x. Instead, the terminal holder 16 may be configured to cover only the area lower than the position of the camera 29 of the terminal device 2x when the terminal device 2x is held by the terminal holding device 1x. In one example, the contact surface 113C of the terminal holder 16 may be formed into a shape extending to the position lower than the position at which the camera 29 of the terminal device 2x is provided (i.e., a shape in which the contact surface 113C does not exist above the position at which the camera 29 of the terminal device 2x is provided). In such an example, it is not necessary to form the hole 17 on the terminal holding device 1x.

While the camera 29 is provided substantially on the center line in the left-right direction of the rear surface 2b of the terminal device 2x in the examples shown in FIGS. 8A to 8C, it is not limited that the camera 29 is provided at such a position. For example, the camera 29 may be provided at a position shifted, to some extent, from the center line in the left-right direction of the rear surface 2b. In this case, instead of forming the hole 17 on the terminal holder 16, a cutout may be formed at a part including the position of the camera 29 of the terminal device 2x when the terminal device 2x is held by the terminal holding device 1x.

FIG. 9 schematically illustrates a configuration of the terminal device 2x. As illustrated in FIG. 9, the terminal device 2x mainly includes a CPU 21, a ROM 22, a RAM 23, a communication unit 24, a display unit 25, a speaker 26, a microphone 27, an operation unit 28 and the camera 29. The terminal device 2x is a portable-type terminal device such as a smartphone having a telephone call function.

The CPU (Central Process Unit) 21 executes control of the terminal device 2x in its entirety. The ROM (Read Only Memory) 22 has a non-volatile memory, not shown, storing control program for controlling the terminal device 2x. The RAM (Random Access Memory) 23 stores data set by a user via the operation unit 26 in a readable manner, and provides a working area for the CPU 21.

The communication unit 24 is configured to be able to perform wireless communication with other terminal device 2x via a communication network. The display unit 25 may be a liquid crystal display, and displays characters and images to the user. The speaker 26 outputs sounds to the user. The microphone 27 collects voices spoken by the user.

The operation unit 28 may be operation buttons or a touch panel type input device provided on a casing of the terminal device 2x, to which various selections and instructions by the user is inputted. If the display unit 25 is a touch panel type, the touch panel provided on the display screen of the display unit 25 may function as the operation unit 28.

The camera 29 may be a CCD camera, for example, and is provided on the rear surface 2b of the terminal device 2x as illustrated in FIGS. 8B and 8C. Basically, the direction of the optical axis (an axis extending vertically from the center of the lens) of the camera 29 coincides with the vertical direction of the rear surface of the terminal device 2x (i.e., the normal direction). The camera 29 may be provided, not only on the rear surface 2b of the terminal device 2x, but also on the front surface 2a of the terminal device 2x.

(Captured Image Correcting Method)

Next, the description will be given of a correcting method of the captured image by the camera 29, executed by the CPU 21 in the second embodiment.

First, with reference to FIG. 10, the drawback caused according to the mounting position of the terminal device 2x will be described. FIG. 10 illustrates a view of the terminal device 2x, observed from upside thereof, in a state mounted in the compartment of the vehicle 3, and also illustrates an example of the captured image by the camera 29 of the terminal device 2x. In FIG. 10, for convenience of explanation, the terminal device 2x is illustrated in a simplified manner and the illustration of the terminal holding device 1x is omitted. Actually, the terminal device 2x is mounted in the compartment of the vehicle 3 in a state held by the terminal holding device 1x.

FIG. 10 illustrates the example in which the terminal device 2x is mounted generally in front of the driver's seat and the example in which the terminal device 2x is mounted between the driver's seat and the assistant driver's seat. (In both cases, the terminal device 2x is mounted on the dashboard.) Normally, in order to observe the display unit 25 of the terminal device 2x, the user mounts the terminal device 2x such that the display unit 25 is directed to the user. In a case where the terminal device 2x is mounted generally in front of the driver's seat, if the terminal device 2x is mounted such that the display unit 25 is directed to the user, the terminal device 2x tends be directed to the traveling direction of the vehicle 3. Specifically, since the front surface 2a on which the display unit 25 is provided and the rear surface 2b on which the camera 29 is provided are substantially in parallel with each other in the terminal device 2x, the front direction (vertical direction) of the rear surface 2b tends to roughly coincide with the traveling direction of the vehicle 3. In other words, the direction along the front surface 2a and the rear surface 2b of the terminal device 2x tends to be almost perpendicular to the traveling direction.

In contrast, in the case where the terminal device 2x is mounted between the driver's seat and the assistant driver's seat, if the terminal device 2x is mounted such that the display unit 25 is directed to the user, the terminal device 2x tends to be not directed to the traveling direction of the vehicle 3. Specifically, since the front surface 2a on which the display unit 25 is provided and the rear surface 2b on which the camera 29 is provided are substantially in parallel with each other in the terminal device 2x, the front direction (vertical direction) of the rear surface 2b tends to be not coincident with the traveling direction of the vehicle 3. In other words, the direction along the front surface 2a and the rear surface 2b of the terminal device 2x tends to be not generally perpendicular to the traveling direction.

When the terminal device 2x is mounted generally in front of the driver's seat, it may affect the visual field of the user. Depending on the kind of the vehicle, it may be difficult to mount the terminal device 2x generally in front of the driver's seat. Therefore, the terminal device 2x tends to be mounted on the position other than the front of the driver's seat.

In FIG. 10, the captured image 101 shown by the dot and dash line indicates an example of the image captured by the camera 29 when the terminal device 2x is mounted generally in front of the driver's seat. The captured image 102 shown by the broken line 102 indicates an example of the image captured by the camera 29 when the terminal device 2x is mounted between the driver's seat and the assistant driver's seat. In FIG. 10, it is understood that the center position 101A in the left-right direction of the captured image 101 and the center position 102a in the left-right direction of the captured image 102 do not coincide. This means that the image capturing directions of the camera 29 do not coincide in the case where the terminal device 2x is mounted generally in front of the driver's seat and in the case where the terminal device 2x is mounted between the driver's seat and the assistant driver's seat.

The "image capturing direction" of the camera 29 means the direction of the camera 29, and generally coincides with the vertical direction of the rear surface 2b of the terminal device 2x. More specifically, the "image capturing direction" corresponds to the optical axis direction of the lens of the camera 29. In the second embodiment, it is assumed that the front-rear direction (specifically the front direction) of the vehicle 3 is used as the "traveling direction" of the vehicle 3.

Specifically, in the case where the terminal device 2x is mounted generally in front of the driver's seat, since the vertical direction of the rear surface 2b to which the camera 29 is provided in the terminal device 2x generally coincides with the traveling direction of the vehicle 3 as described above, the image capturing direction of the camera 29 generally coincides with the traveling direction. Therefore, in this case, the center position 101A of the captured image 101 generally coincides with the position corresponding to the traveling direction of the vehicle 3 in the captured image 101. In contrast, in the case where the terminal device 2x is mounted between the driver's seat and the assistant driver's seat, since the vertical direction of the rear surface 2b to which the camera 29 is provided in the terminal device 2x does not coincide with the traveling direction of the vehicle 3 as described above, the image capturing direction of the camera 29 does not coincide with the traveling direction. Therefore, in this case, the center position 102a of the captured image 102 generally does not coincide with the position corresponding to the traveling direction of the vehicle 3 in the captured image 102.

Here, there is known a navigation using an actually captured image (corresponding to the image generated based on the captured image) by the camera 29 of the terminal device 2x, hereinafter referred to as "display image"). This navigation is called AR (AR: Augmented Reality) navigation, in which the image for the route guide, such as the direction and the distance to the destination, is displayed in a manner superimposed on the display image. At the time of executing the AR navigation, if the image capturing direction of the camera 29 and the traveling direction of the vehicle 3 do not coincide, the AR navigation cannot be appropriately executed. For example, the image for the route guide is not displayed at an appropriate position in the display image, or no position for displaying the image for the route guide is found.

This drawback tends to be caused, not because of the mounting position of the terminal device 2x itself in the compartment, but because the direction of the terminal device 2x is variously set such that the display unit 25 is directed to the user and hence the image capturing direction of the camera 29 deviates from the traveling direction of the vehicle 3.

In the second embodiment, in order to overcome the drawback caused when the image capturing direction of the camera 29 and the traveling direction of the vehicle 3 do not coincide as described above, the captured image of the camera 29 is corrected. Specifically, the CPU 21 in the terminal device 2x corrects the captured image of the camera 29 based on the deviation of the image capturing direction of the camera 29 with respect to the traveling direction of the vehicle, thereby to generate the display image to be used for the AR navigation. In this case, the CPU 21 obtains the deviation of the image capturing direction with respect to the traveling direction, and corrects the captured image based on the deviation such that the center position of the display image in the left-right direction coincides with the position corresponding to the traveling direction.

In this specification, "correcting the captured image" means the processing of extracting the image to be displayed from the captured image of the camera 29 based on the deviation of the image capturing direction with respect to the traveling direction, i.e., the processing of taking in a part of the captured image as the display image.

Figure 11:
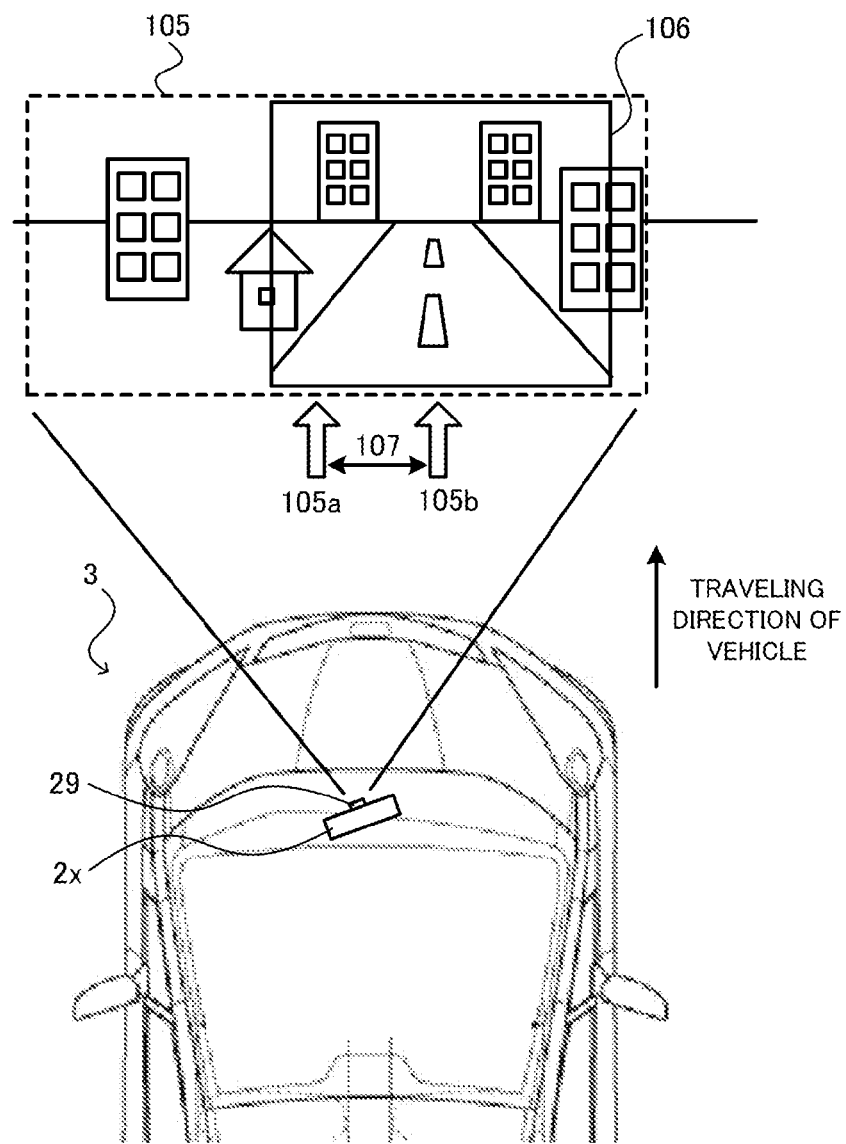
FIG. 11 is a diagram for explaining a fundamental concept of a correcting method of a captured image according to the second embodiment.

With reference to FIG. 11, fundamental concept of the correction method of the captured image according to the second embodiment will be described. Similarly to FIG. 10, FIG. 11 also illustrates the view of the terminal device 2x in the state mounted in the compartment of the vehicle 3 observed from upside, and an example of the captured image by the camera 29 of the terminal device 2x. In FIG. 11, for convenience of explanation, the terminal device 2x is illustrated in the simplified manner, and the illustration of the terminal holding device 1x is omitted.

FIG. 11 illustrates the case where the terminal device 2x is mounted between the driver's seat and the assistant driver's seat (specifically at the position on the dashboard) and the captured image 105 shown by the broken line is obtained by the camera 29. In this case, as described above, if the terminal device 2x is mounted such that the display unit 25 is directed to the user, the front direction (vertical direction) of the rear surface 2b to which the camera 29 is provided in the terminal device 2x does not coincide with the traveling direction of the vehicle 3. Therefore, the image capturing direction of the camera 29 does not coincide with the traveling direction of the vehicle 3. Therefore, the center position 105a of the captured image 105 does not coincide with the position corresponding to the traveling direction of the vehicle 3 in the captured image 105.

In the second embodiment, the CPU 21 performs the processing of correcting the deviation between the center position 105a in the captured image 105 and the position corresponding to the traveling direction. Specifically, first the CPU 21 obtains the deviation of the image capturing direction of the camera 29 with respect to the traveling direction of the vehicle 3 based on the acceleration of the vehicle 3. Next, the CPU 21 obtains the position 105b, which is obtained by shifting the center position 105a in the captured image 105 by the amount corresponding to the deviation (corresponding to the arrow 107). In the second embodiment, the position 105b thus obtained is treated as the position corresponding to the traveling direction in the captured image 105.

Next, in order to make the center position in the left-right direction of the display image coincide with the position corresponding to the traveling direction, the CPU 21 extracts the image whose center position in the left-right direction coincides with the position 105b, and uses the extracted image as the display image. Specifically, the CPU 21 generates an image 106 within a predetermined range from the position 105b corresponding to the center position (i.e., an image 106 having predetermined size in the left-right direction) as the display image. In this case, the CPU 21 cuts off the image other than the image 106 (i.e., the images at both ends of the image 106) from the captured image 105.

The "predetermined range" used at the time of generating the display image is determined in advance according to the size and/or range of the image to be displayed. For example, the "predetermined range" is determined by the setting in the AR navigation.

Figure 12:
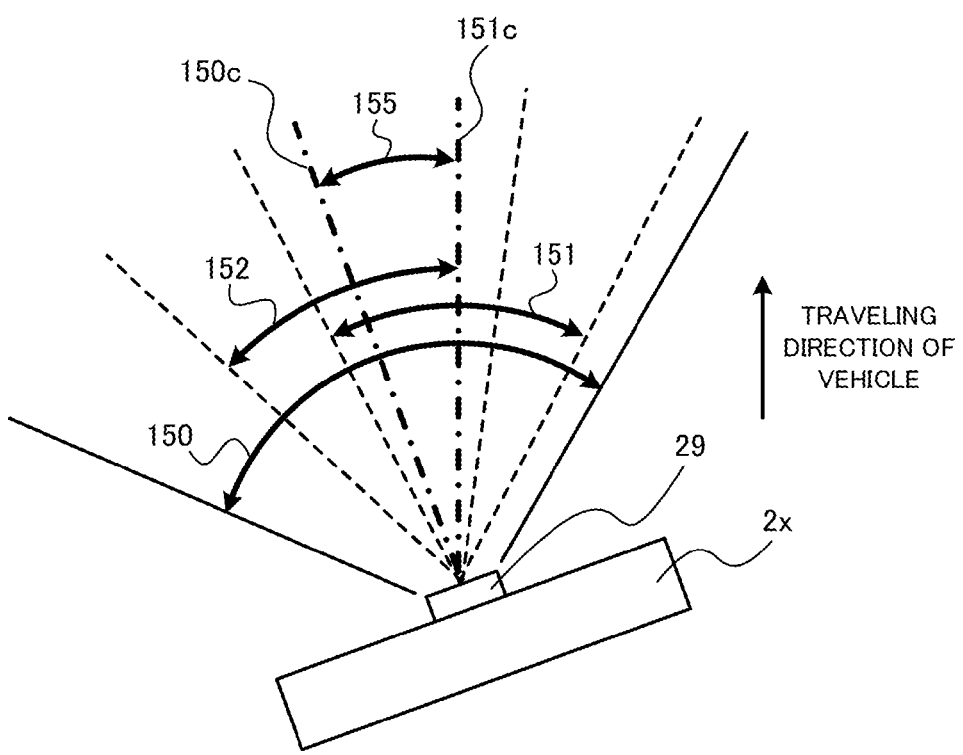
FIG. 12 is a diagram for explaining the correcting method of a captured image according to the second embodiment more specifically.

With reference to FIG. 12, the correcting method of the captured image according to the second embodiment will be described more specifically. FIG. 12 illustrates a view of the terminal device 2x observed from upside thereof. Here, it is a view of the state that the image capturing direction of the camera 29 does not coincide with the traveling direction of the vehicle 3. In FIG. 12, for convenience of explanation, the terminal device 2x is illustrated in a simplified manner, and the illustration of the terminal holding device 1x is omitted.

In FIG. 12, an angle of view shown by the arrow 150 is the angle of view used by the camera 29 for capturing image. Namely, the angle of view 150 indicates the angle of view of the camera 29 itself. The dot and dash line 150c indicates the center position in the angle of view 150 that the camera 29 uses for capturing image, i.e., the position corresponding to the image capturing direction. It is assumed that the CPU 21 knows the angle of view 150 that the camera 29 uses for capturing image and the center position 150c in the angle of view 150.

In the second embodiment, first the CPU 21 obtains the angle that the image capturing direction of the camera 29 forms with respect to the traveling direction of the vehicle 3 (corresponding to the angle shown by the arrow 155, hereinafter suitably referred to as "deviation angle"), based on the output of the sensor 15d. The method of obtaining the deviation angle will be described later in detail.

Next, the CPU 21 obtains the position 151c by shifting the center position 150c of the angle of view 150, that the camera 29 uses for capturing image, by the deviation angle 155. In this case, the CPU 21 treats the obtained position 151c as the position corresponding to the traveling direction of the vehicle 3. Namely, out of the angle of view 150, the CPU 21 uses the position 151c as the center position of the angle of view (hereinafter referred to as "display angle of view") used for the actual display.

Next, in the angle of view 150 that the camera 29 uses for capturing image, the CPU 21 obtains the angle of view (shown by the arrow 151), including the obtained position 151c as a center and having a width of a predetermined angle, as the display angle of view. Thereafter, from the captured image by the camera 29, the CPU 21 generates the image within the range defined by the obtained display angle of view 151 as the display image. As illustrated in FIG. 11, doing this corresponds to generating the image 106 within the predetermined range from the center position 105b, out of the captured image 105, as the display image.

The present invention is not limited to obtain the position 151c corresponding to the traveling direction and to obtain the display angle of view 151 based on the position 151c as described above. In another example, the display angle of view 151 may be obtained without obtaining the position 151c corresponding to the traveling direction. Specifically, the display angle of view may be obtained by shifting the display angle of view, normally used for generating the display image from the captured image as shown by the arrow 152 (the angle of view including the center position 150c and having a width of a predetermined angle), by the deviation angle 155.

According to the second embodiment as described above, based on the deviation angle of the image capturing direction of the camera 29 with respect to the traveling direction of the vehicle 3, the captured image may be appropriately corrected to generate the display image. Specifically, it is possible to appropriately generate the display image having the position corresponding to the traveling direction of the vehicle 3 as the center position. By this, if the terminal device 2x is mounted in a state that it is not directed to the traveling direction of the vehicle 3 (i.e., the image capturing direction of the camera 29 does not coincide with the traveling direction of the vehicle 3), the AR navigation can be appropriately performed by using the generated display image. For example, the image used for route guide in the AR navigation can be displayed at an appropriate position on the display image.

Further, according to the second embodiment, unlike the technique described in the aforementioned Patent Document 1, the image analysis of the captured image is not performed. Therefore, in comparison with that technique, the processing burden may be reduced.

Desirably, the angle of view of the camera 29 is designed such that, within the range of the direction of the terminal device 2x supposed to be set by the user in order to observe the display unit 25, all the display angle of view obtained when the user variously changes the direction of the terminal device 2x are included in the range of the angle of view of the camera 29 itself. Namely, it is desired to use the camera 29 having the angle of view covering all the display angle of view obtained as described above, even if the user variously changes the direction of the terminal device 2x within the range of the supposed direction of the terminal device 2x.

(Deviation Angle Calculating Method)

Next, with reference to FIGS. 13A to 13C, the description will be given of a specific example of a method of calculating the deviation angle of the image capturing direction with respect to the traveling direction of the vehicle 3.

Figure 13A:
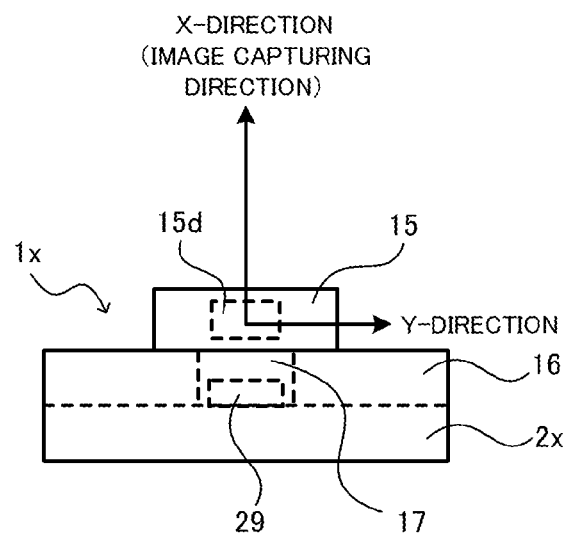
FIGS. 13A to 13C are diagrams for explaining a method of calculating a deviation angle of the image capturing direction of a camera with respect to a traveling direction of a vehicle.

FIG. 13A illustrates a view of the terminal device 2x in a state held by the terminal holding device 1x observed from upside thereof. In FIG. 13A, for convenience of explanation, the terminal holding device 1x and the terminal device 2x are illustrated in a simplified manner. As illustrated in FIG. 13A, the sensor 15d is provided in the substrate holder 15 of the terminal holding device 1x. The sensor 15d is an acceleration sensor (i.e., G sensor) configured to be able to detect acceleration in two-dimensional directions. In the following description, the "sensor 15d" will be expressed as the "acceleration sensor 15d". As described above, in the state that the terminal device 2x is held by the terminal holding device 1x (specifically, in the state that the connector of the terminal device 2x is connected with the connector 16a in the terminal holder 16), the output signal of the acceleration sensor 15d is supplied to the terminal device 2x via the sensor substrate 15c in the substrate holder 15 and the wiring 16b and the connector 16a in the terminal holder 16. In this case, the CPU 21 in the terminal device 2x obtains the output signal of the acceleration sensor 15d.

Specifically, the acceleration sensor 15d detects the acceleration in the X-direction and the Y-direction as shown in FIG. 13A. Since the acceleration sensor 15d is fixed to the terminal holding device 1x and its positional relation with the camera 29 of the terminal device 2x attached to the terminal holding device 1x is constant, the X-direction and Y-direction in which the acceleration sensor 15d detects the acceleration have a constant relation with the image capturing direction of the camera 29. In the second embodiment, as illustrated in FIG. 13A, the X-direction and the image capturing direction coincide.

Figure 13B:
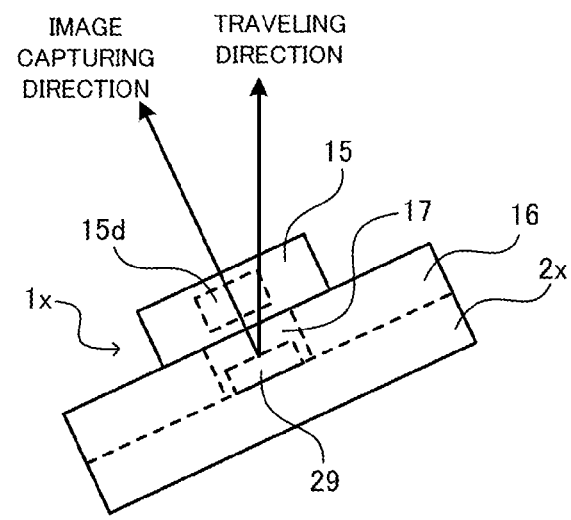

While FIG. 13B illustrates the terminal device 2x in the state held by the terminal holding device 1x similarly to FIG. 13A, FIG. 13B illustrates the state that the terminal device 2x is not directed to the traveling direction of the vehicle 3, i.e., the state that the image capturing direction of the camera 29 does not coincide with the traveling direction of the vehicle 3. In a state that the terminal device 2x is held by the terminal holding device 1x, the direction of the terminal holding device 1x coincides with the direction of the terminal device 2x. Therefore, by the acceleration sensor 15d in the terminal holding device 1x, the direction of the terminal device 2x (specifically the image capturing direction by the camera 29 in the terminal device 2x) can be appropriately detected.

Figure 13C:
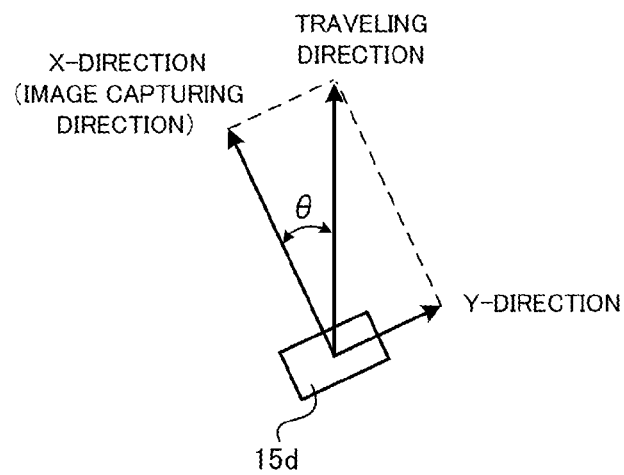

FIG. 13C illustrates only the acceleration sensor 15d in FIG. 13B. The acceleration sensor 15d detects acceleration in two-dimensional directions, i.e., the X-direction and the Y-direction as shown in FIG. 13C. The X-direction corresponds to the image capturing direction of the camera 29. When the image capturing direction of the camera 29 deviates from the traveling direction of the vehicle 3, the deviation angle θ of the image capturing direction (X-direction) with respect to the traveling direction of the vehicle 3 can be calculated from the ratio of the X-direction acceleration to the Y-direction acceleration detected by the acceleration sensor 15d. The deviation angle θ can be calculated by the following equation (1):

$$\text{Deviation Angle } \theta = \arctan(Y\text{-direction acceleration}/X\text{-direction acceleration}) \quad (1)$$

Specifically, the deviation angle θ is calculated by the CPU 21 in the terminal device 2x. In this case, the CPU 21 obtains the output signals corresponding to the X-direction acceleration and the Y-direction acceleration detected by the acceleration sensor 15d, and calculates the deviation angle θ based on the output signals.

While the above description discloses the example of calculating the deviation angle based on the output of the acceleration sensor 15d provided in the substrate holder 15 of the terminal holding device 1x, the present invention is not limited to this. Instead of the acceleration sensor 15d, the output from the sensor provided in the vehicle 3 or the output from the sensor provided in a navigation apparatus installed in the vehicle 3 separately from the terminal device 2x may be used to calculate the deviation angle.

(Captured Image Correcting Processing)

Figure 14:
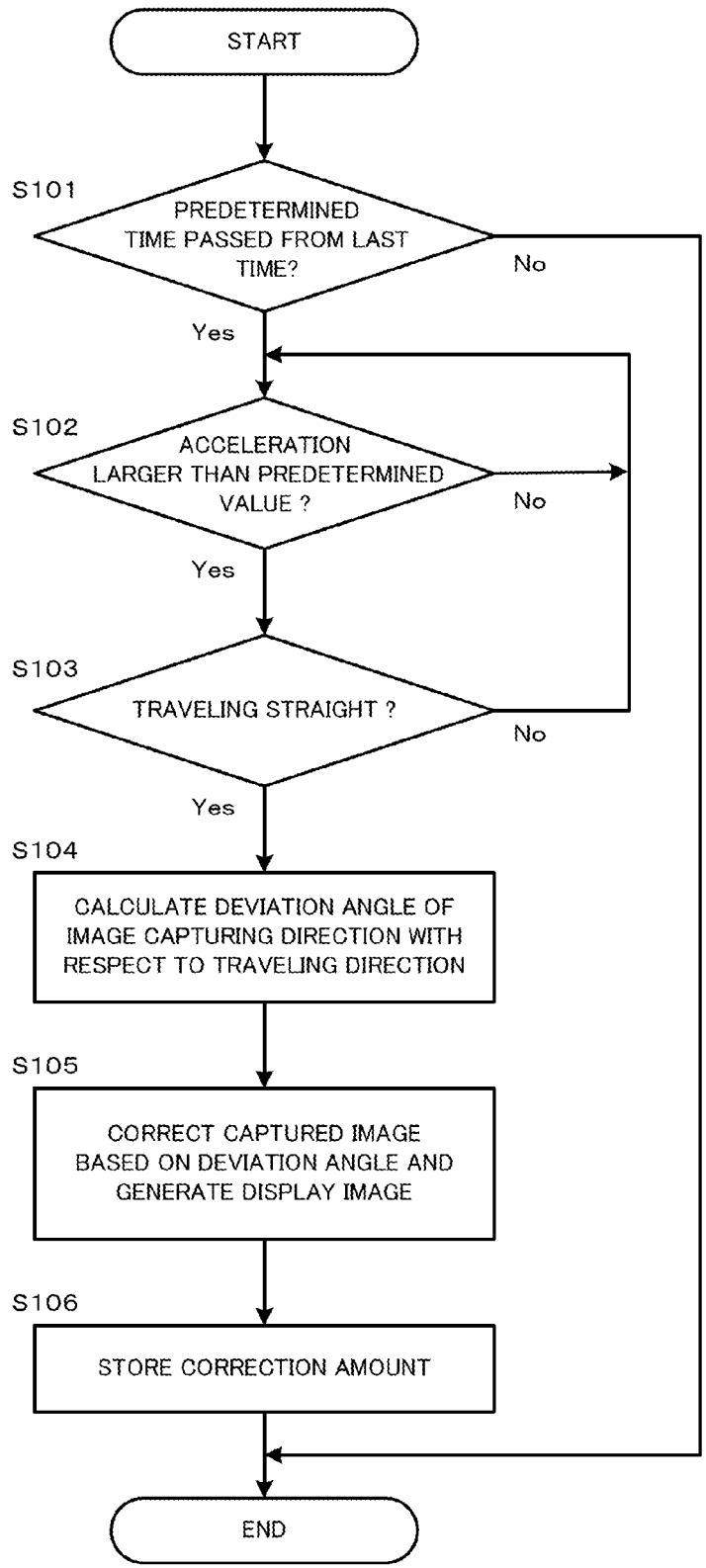
FIG. 14 is a flowchart illustrating a captured image correcting processing according to the second embodiment.

Next, with reference to FIG. 14, the captured image correcting processing according to the second embodiment will be described. FIG. 14 is a flowchart illustrating the captured image correcting processing according to the second embodiment. This processing is realized by the CPU 21 in the terminal device 2x, which executes the program stored in the ROM 22.

First, in step S101, the CPU 21 determines whether or not a predetermined time has passed since the captured image correcting processing is executed last time. This determination is executed every predetermined time period (i.e., in a predetermined cycle) in order to repeatedly execute the captured image correcting processing. If the predetermined time has passed (step S101; Yes), the processing goes to step S102. If the predetermined time has not passed (step S101; No), the processing ends.

In step S102, the CPU 21 determines whether or not the acceleration of the vehicle 3 is larger than a predetermined value. For example, the CPU 21 determines whether or not the X-direction acceleration detected by the acceleration sensor 15d is larger than a predetermined value. This determination is executed in order to execute the subsequent steps by using a stable output value of the acceleration sensor 15d, thereby ensuring the accuracy of correcting the captured image. The "predetermined value" used in this determination may be set to the acceleration value capable of ensuring the accuracy of correcting the captured image, for example.

If the acceleration is larger than the predetermined value (step S102; Yes), the processing goes to step S103. If the acceleration is not larger than the predetermined value (step S102), the processing returns to step S102.

In step S103, the CPU 21 determines whether the vehicle 3 is traveling in a straight line (i.e., going straight). Specifically, the CPU 21 determines whether or not the vehicle 3 is traveling in a straight line, based on the ratio of the X-direction acceleration to the Y-direction acceleration detected by the acceleration sensor 15d. In detail, the CPU 21 samples plural ratios of the X-direction acceleration (larger than a predetermined value) to the Y-direction acceleration. Then, the CPU 21 determines that the vehicle 3 is traveling in a straight line if the values of the plural ratios are almost constant, and determines that the vehicle 3 is not traveling in a straight line if the values of the plural ratios are varying. This determination is also executed in view of ensuring the accuracy of correcting the captured image. Specifically, this determination is done to execute the correction of the captured image using the output value of the acceleration sensor 15d at the time when the traveling direction of the vehicle 3 coincide with the front-rear direction of the vehicle 3.

If the vehicle 3 is traveling in a straight line (step S103; Yes), the processing goes to step S104. If the vehicle 3 is not traveling in a straight line (step S103; No), the processing returns to step S102.

In step S104, the CPU 21 calculates the deviation angle of the image capturing direction of the camera 29 with respect to the traveling direction of the vehicle 3. For example, the CPU 21 calculates the deviation angle by the equation (1), based on the ratio of the X-direction acceleration to the Y-direction acceleration detected by the acceleration sensor 15d. Then, the processing goes to step S105.

In step S105, the CPU 21 corrects the captured image based on the deviation angle calculated in step S104, and generates the display image. Specifically, the CPU 21 obtains the position where the center position of the angle of view that the camera 29 uses for capturing image is shifted by the deviation angle, and determines the angle of view, including the obtained position as the center and having a width of a predetermined angle, as the display angle of view. Instead, the CPU 21 may determines the angle of view, which is obtained by shifting the display angle of view normally used to generate the display image from the captured image by the deviation angle, as the display angle of view. Thereafter, from the captured image, the CPU 21 generates the image within the range prescribed by the display angle of view thus obtained, as the display image. The CPU 21 displays the display image thus generated on the display unit 25. Then, the processing goes to step S106.

In step S106, the CPU 21 stores the data of the deviation angle and/or the display angle of view, used to generate the display image in step S105, in the ROM 22 as the correction amount. Then, the processing ends. Until the above-mentioned predetermined time has passed (i.e., in the case where "step S101; No"), the CPU 21 corrects the captured image by using the correction amount stored in step S106 and generate the display image. The CPU 21 retains the correction amount after the engine of the vehicle 3 is turned off, and uses the retained correction amount after the engine is started until the acceleration becomes larger than the predetermined value.

According to the captured image correcting processing described above, based on the deviation angle of the image capturing direction of the camera 29 with respect to the traveling direction of the vehicle 3, the captured image can be appropriately corrected to generate the display image. Specifically, it is possible to generate the display image having the position corresponding to the traveling direction of the vehicle 3 as the center position. Therefore, even if the terminal device $2x$ is mounted in a state not directed to the traveling direction of the vehicle 3, the AR navigation can be appropriately performed by using the generated display image.

In the example described above, it is determined whether or not the vehicle 3 is traveling in a straight line based on the ratio of the X-direction acceleration to the Y-direction acceleration detected by the acceleration sensor $15d$ (step S103). However, the present invention is not limited to the determination based on the ratio of the X-direction acceleration to the Y-direction acceleration. In another example, it can be determined whether or not the vehicle 3 is traveling in a straight line based on the navigation information used by the AR navigation. Specifically, it is possible to determine whether the road that the vehicle 3 is currently traveling is straight or curved from the navigation information such as the route information and/or the map information, and determines that the vehicle 3 is traveling in a straight line in step S103 when the road currently traveling is determined to be straight.

While the captured image correcting processing of FIG. 14 executes all the determinations of steps S101, S102 and S103 in the above-described example, any one or more of the determination in steps S101, S102 and S103 ma be executed instead. Namely, any one or two of the determination in steps S101, S102 and S103 is executed, and the captured image may be corrected if the condition in the determination is satisfied.

Modified Example of 2nd Embodiment

In the above description, an example is described in which the captured image correcting processing is repeatedly executed in a predetermined cycle. In the modified example, instead of repeatedly executing the captured image correcting processing in a predetermined cycle, the captured image correcting processing is executed only when the mounting condition of the terminal device $2x$ is changed.

Figure 15:
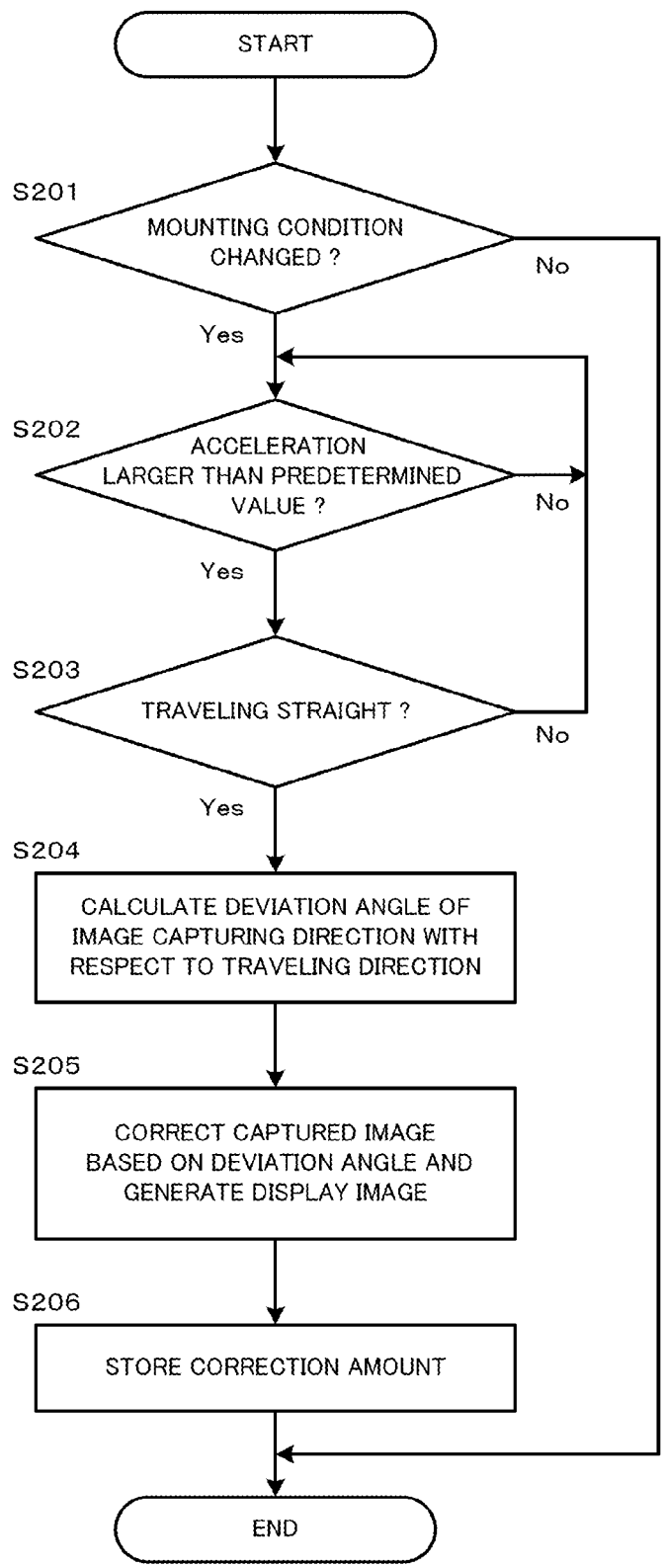
FIG. 15 is a flowchart illustrating a captured image correcting processing according to a modified example of the second embodiment.

With reference to FIG. 15, the captured image correcting processing according to the modified example will be described. FIG. 15 is a flowchart illustrating the captured image correcting processing according to the modified example. This processing is realized by the CPU 21 in the terminal device $2x$ which executes the program stored in the ROM 22.

The modified example differs from the above-described second embodiment in that the process in step 201 is executed instead of the process in step S101 shown in FIG. 14. Since the process in steps S202 to S206 are the same as the process in steps S102 to S106 shown in FIG. 14, description thereof will be omitted. Here, only the process in step S201 will be described.

In step S201, the CPU 21 determines whether or not the mounting condition of the terminal device $2x$ is changed. In this case, the CPU 21 determines whether the user changed the direction of the terminal device $2x$, whether the user removed the terminal device $2x$ from the terminal holding device $1x$, or whether the user attached the terminal device $2x$ to the terminal holding device $1x$. The reason why such a determination is made is to execute the correction of the captured image in the case where the mounting condition of the terminal device $2x$ is changed and accordingly the deviation angle of the image capturing direction of the camera 29 with respect to the traveling direction of the vehicle 3 tends to change. Namely, when the mounting condition of the terminal device $2x$ is changed, it is not appropriate to correct the captured image by the correction amount obtained last time, and the captured image should be corrected after obtaining new correction amount.

Specifically, the CPU 21 determines whether or not the mounting condition of the terminal device $2x$ is changed by the methods described by the following first to fourth examples.

In the first example, the terminal holding device $1x$ is provided with an acceleration sensor capable of detecting the acceleration in an up-down direction, and the CPU 21 determines whether or not the mounting condition of the terminal device $2x$ is changed based on the output of the acceleration sensor. Specifically, the CPU 21 determines that the mounting condition of the terminal device $2x$ is changed if the acceleration sensor detects the acceleration in the up-down direction. For example, the method of the first example may be realized by providing the terminal holding device $1x$ with an acceleration sensor capable of detecting acceleration in the three-dimensional directions, instead of the above-mentioned acceleration sensor $15d$.

In the second example, the CPU 21 determines that the mounting condition of the terminal device $2x$ is changed when acceleration sensor $15d$ detects the acceleration that is never caused by a normal handle operation. Specifically, the CPU 21 samples plural ratios of the X-direction acceleration to the Y-direction acceleration, and determines that the mounting condition of the terminal device $2x$ is changed when the values of the plural ratios thus sampled are largely varying. For example, the CPU 21 determines that the mounting condition of the terminal device $2x$ is changed if the values of the plural ratios thus sampled are larger than the value of the ratio of the X-direction acceleration to the Y-direction acceleration normally occurs when the vehicle 3 curves.

In the third example, the CPU 21 determines whether or not the mounting condition of the terminal device $2x$ is changed based on the navigation information used by the AR navigation and the output of the acceleration sensor $15d$. Specifically, the CPU 21 determines that the mounting condition of the terminal device $2x$ is changed if the road that the vehicle 3 is currently traveling is determined to be a straight road according to the navigation information and the acceleration sensor $15d$ detects the acceleration that is never caused during the straight traveling. Specifically, during the straight traveling, the value of the ratio of the X-direction acceleration to the Y-direction acceleration becomes almost constant. However, if the value of the ratio is varying, the CPU 21 determines that the mounting condition of the terminal device $2x$ is changed. On the other hand, the CPU 21 does not perform the determination as to whether or not the mounting condition of the terminal device $2x$ is changed, if the road that the vehicle 3 is currently traveling is determined to be curving according to the navigation information. In this case, the output value of the acceleration sensor $15d$ tends to be unstable, and hence the determination as to the mounting condition is not performed to prevent erroneous determination.

In the fourth example, the CPU 21 determines that the mounting condition of the terminal device $2x$ is changed, when the user operates the operation unit 28 of the terminal device 2x. Namely, the CPU 21 determines that the mounting condition of the terminal device 2x is changed when some inputs are made via the operation unit 28. For example, the CPU 21 determines that the mounting condition of the terminal device 2x is changed when an operation to end the AR navigation or an operation to power off the terminal device 2x is made.

When it is determined that the mounting condition of the terminal device 2x is changed (step 201; Yes) by the methods according to the first to fourth examples described above, the processing goes to step S202. When it is not determined that the mounting condition of the terminal device 2x is changed (step S201; No), the processing ends. The present invention is not limited to the determination of using only one of the first to fourth examples. Any two or more of the first to fourth examples may be used, in combination, to perform the determination.

According to the modified example described above, the mounting condition of the terminal device 2x can be appropriately detected, and the captured image can be appropriately corrected when the mounting condition is changed. Also, according to the modified example, since the captured image correcting processing is not repeatedly executed in a predetermined cycle unlike the above-described second embodiment (see. FIG. 15), the processing burden may be reduced. In the above-described second embodiment, since the captured image correcting process is repeatedly executed in a predetermined cycle, the captured image can be corrected at any time, without consideration of the change of the mounting condition of the terminal device 2x.

While the captured image correcting processing of FIG. 15 executes all the determinations of steps S201, S202 and S203 in the above-described example, any one or more of the determination in steps S201, S202 and S203 ma be executed instead. Namely, any one or two of the determination in steps S201, S202 and S203 is executed, and the captured image may be corrected if the condition in the determination is satisfied.

While the present invention is applied to a vehicle in the above description, the application of the present invention is not limited to this. The present invention may be applied to various movable bodies such as a ship, a helicopter and an airplane other than the vehicle.

As described above, the embodiment is not limited to the first and second embodiments described above, and may be alterable as needed without contradicting the gist and the idea of the invention readable from claims and specification in its entirety.

INDUSTRIAL APPLICABILITY

The present invention can be used in a cell phone having a telephone call function and a navigation apparatus performing route guide.

DESCRIPTION OF REFERENCE NUMBERS

1 Terminal Holding Device
2 Terminal Device
11 Base
12 Hinge
13 Arm
15 Substrate Holder
15a Cover
15b Ball Link
15c Sensor Substrate
15d Sensor (Acceleration Sensor)
16 Terminal Holder
17 Hole
21 CPU
25 Display Unit
29 Camera

The invention claimed is:

1. A terminal holding device comprising:
an attaching unit to be attached to a vehicle;
a holding unit which removably holds a terminal device in such a manner that a display unit of the terminal device is exposed and which includes a contact surface to be in contact with the terminal device;
an acceleration sensor which detects acceleration in a direction from a side of the contact surface to a side opposite to the contact surface;
a supplying unit which supplies a detection signal of the acceleration sensor to the terminal device;
a housing unit which is attached to a side of the holding unit opposite to the contact surface, and which houses the acceleration sensor in a fixed state;
a support member which supports the housing unit in a manner swingable with respect to the attaching unit; and
a connecting unit which rotates the holding unit with respect to the housing unit to change an attaching angle of the holding unit with respect to the housing unit.

2. The terminal holding device according to claim 1, wherein the connecting unit changes the attaching angle of the holding unit with respect to the acceleration sensor, without changing an attaching angle of the acceleration sensor with respect to the attaching unit.

3. The terminal holding device according to claim 1, wherein the holding unit includes a hole which exposes a camera unit provided on the terminal device; and
wherein the acceleration sensor is provided to detect the acceleration in a direction penetrating the hole.

4. A terminal holding device comprising:
an attaching unit to be attached to a vehicle;
a holding unit which removably holds a terminal device in such a manner that a display unit of the terminal device is exposed;
an acceleration sensor which detects acceleration in a direction from a side of the display unit to a side opposite to the display unit of the terminal device held by the holding unit;
a supplying unit which supplies a detection signal of the acceleration sensor to the terminal device;
a housing unit which is attached to a side of the holding unit opposite to a side holding the terminal device, and which houses the acceleration sensor in a fixed state;
a support member which supports the housing unit in a manner swingable with respect to the attaching unit; and
a connecting unit which rotates the holding unit with respect to the housing unit to change an attaching angle of the holding unit with respect to the housing unit.

5. The terminal holding device according to claim 1, wherein the connecting unit fixes the holding unit to the housing unit at every 90-degree rotation angle.

6. The terminal holding device according to claim 4, wherein the connecting unit fixes the holding unit to the housing unit at every 90-degree rotation angle.

* * * * *